J. F. BOEPPLE.
HOOK FOR CATCHING SHELL FISH.
APPLICATION FILED AUG. 11, 1909.

975,927.

Patented Nov. 15, 1910.

Inventor
Johann F. Boepple.

Witnesses

By his Attorney

UNITED STATES PATENT OFFICE.

JOHANN F. BOEPPLE, OF CANNELTON, INDIANA.

HOOK FOR CATCHING SHELL-FISH.

975,927.    Specification of Letters Patent.    Patented Nov. 15, 1910.

Application filed August 11, 1909. Serial No. 512,472.

*To all whom it may concern:*

Be it known that I, JOHANN F. BOEPPLE, a citizen of the United States of America, residing at Cannelton, in the county of Perry and State of Indiana, have invented certain new and useful Improvements in Hooks for Catching Shell-Fish, of which the following is a specification, reference being had therein to the accompanying drawing.

My invention relates to improvements in hooks for catching shellfish, particularly mussels, and has for its object to provide a device which will prove effective in catching mussels and holding them.

As is well-known, mussels lie on the bottoms of rivers and other bodies of water with their shells open in order to feed, and when any moving foreign body is thrust between their shells the mussels immediately close them on the same and will not voluntarily release their hold. It sometimes happens, however, with the hooks now in use, that a mussel is pulled off the hook by being dragged against some obstruction on the bottom of the river. Also with the hooks now in use, mussels which are too small for commercial purposes are frequently caught, and as the hooks often inflict serious injuries to the mouths and other portions of the fish, it follows that when they are removed from the hooks and thrown back into the water a large percentage of them die. With my improved hook, however, these manifest disadvantages are reduced to a minimum.

Broadly, the invention consists in flattening the end portions of the hooks, and providing their extreme ends with heads or knobs, which are preferably flat on their undersides. With a hook so constructed when the head thereof has entered between the shell of a mussel, the fish closes its shell, the contour of which readily permits the opposite edges of the shell to contact or engage the sides of the flattened end portion of the hook. Owing to the head on the end of the hook, it will not be liable to enter between the open shells of mussels too small for commercial purposes, and, hence, a large proportion of the young mussels now killed will be left undisturbed to be caught later when they are of serviceable size.

Figure 1:
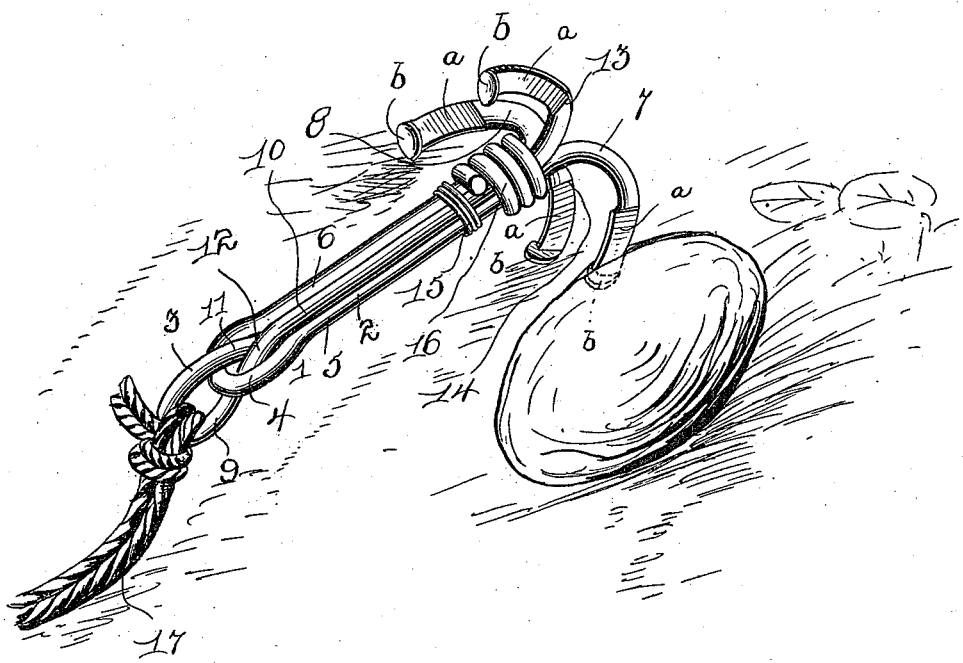
Figure 2:
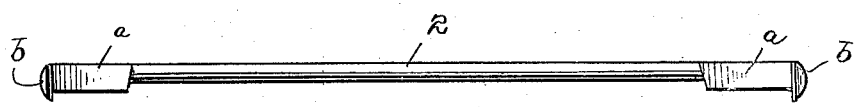
Figure 3:
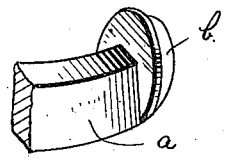

In the accompanying drawings:—Figure 1 is a perspective view of my improved shellfish hook illustrating the manner in which a mussel engages the same. Fig. 2 is a side view of one of the bars (before bending) constituting the hook. Fig. 3 is a perspective view (enlarged) of one end of the bar shown in Fig. 2.

Referring to the drawings, which illustrate the preferred embodiments of my invention, 1 designates the hook, which is preferably constructed of two bars 2 and 3. Bar 2 is bent upon itself at its center so as to form a loop 4 with arms 5 and 6 extending straight and near together for a portion of their length. The end portions of the arms 5 and 6 are bent over to form divergently arranged curved ends 7 and 8. Bar 3 is also bent upon itself, at its center, forming a loop 9, with the arms 10 and 11 thereof passed through the loop 4 and crossing each other, as at 12, and lying for a portion of their length, one on each side of the arms 5 and 6. The end portions 13 and 14 of the arms 10 and 11 are bent or curved over similar to the curved end portions 7 and 8 of the arms 5 and 6.

The curved end portions 7 and 8 and 13 and 14 of the arms 5 and 6 and 10 and 11, respectively, are arranged substantially at right angles to each other. For a portion of their length, as at *a*, the curved end portions 7 and 8 and 13 and 14 are flattened rendering them substantially rectangular in cross section, as best shown in Fig. 3. The curved portion of each arm, at the termination of the flattened portion *a*, is provided with a head or knob *b*, which is arranged eccentrically. The heads *b* are curved over from the back or outside of the arms, and hence do not project back of the flattened portion *a*, but overhang the sides and front of it, and this arrangement reduces the liability of the hook engaging obstructions when in use. The tops of the heads *b* are rounded, while the undersides of the projecting or overhanging portions are substantially flat.

The arms 5 and 6 and 10 and 11 are further secured together by means of a piece of wire 15 wound about their lower portions. A round strip of metal 16, preferably lead, is also wound about the lower portion of the hook, and serves as a sinker. The sinker 16 gives the hook sufficient weight so that it will sink rapidly, and be driven well between the shell of a mussel in order that the fish will take a firm grip on the hook.

The end of a rope 17 is shown secured in the loop 9 and this rope serves as the means for manipulating the hook.

What I claim is:—

1. In a device of the character described, a plurality of angularly-disposed members, said angularly-disposed members being provided with flattened end portions, and heads formed at the ends of said flattened portions, said heads overhanging the sides of said flattened portions except at their outer sides whereby said heads will not engage obstructions when dragged along the bottom of a body of water.

2. In a device of the character described, a pair of oppositely disposed arms having a looped connection at one end, a second pair of connected arms crossed and passed through the loop of said first mentioned arms, the free ends of said arms being formed into mussel catching hooks, and means binding said arms together.

3. A device of the character described comprising a bar bent upon itself contiguous to its center to form a pair of oppositely disposed arms having a looped-connection, a second bar bent upon itself to form a pair of arms, said arms being crossed to form a loop and passed through the loop of said first-mentioned arms, the ends of said arms being formed into mussel catching hooks, and a length of metal coiled about said arms to bind said arms together and constituting a weight.

In testimony whereof I hereunto affix my signature in presence of two witnesses.

JOHANN F. BOEPPLE.

Witnesses:
JOHN ELIAS JONES,
NORMA KEISER.